United States Patent
Basu (10) Patent No.: US 11,619,847 B2
(45) Date of Patent: Apr. 4, 2023

(54) UTILIZING 2D MONOLAYER WSE2 NANOSHEETS AS THE PLANAR-ALIGNMENT AGENT IN AN ELECTRO-OPTICAL LIQUID CRYSTAL DEVICE TO IMPROVE ITS OPTICAL TRANSMISSION

(71) Applicant: The Government of the United States of America, as represented by the Secretary of the Navy, Arlington, VA (US)

(72) Inventor: Rajratan Basu, Columbia, MD (US)

(73) Assignee: The Government of the United States of America, as represented by the Secretary of the Navy, Washington, DC (US)

(*) Notice: Subject to any disclaimer, the term of this patent is extended or adjusted under 35 U.S.C. 154(b) by 36 days.

(21) Appl. No.: 17/338,784

(22) Filed: Jun. 4, 2021

(65) Prior Publication Data

US 2022/0043311 A1    Feb. 10, 2022

Related U.S. Application Data

(60) Provisional application No. 63/062,802, filed on Aug. 7, 2020.

(51) Int. Cl.
*G02F 1/1337*    (2006.01)

(52) U.S. Cl.
CPC .................. *G02F 1/1337* (2013.01)

(58) Field of Classification Search
CPC ............ G02F 1/1337; G02F 1/133765; G02F 1/133776; G02F 1/133738
See application file for complete search history.

(56) References Cited

FOREIGN PATENT DOCUMENTS

JP    2005158709 A  *  6/2005

OTHER PUBLICATIONS

Basu, Rajratan, and Lukas J. Atwood. "Electro-optic liquid crystal device employing two-dimensional WSe 2 as the planar-alignment layers." Optical Materials Express 10.6 (2020): 1405-1412.
Yao, Zihan, et al. "Material synthesis and device aspects of monolayer tungsten diselenide." Scientific reports 8.1 (2018): 1-8.
Shehzad, Muhammad Arslan, et al. "Study of grains and boundaries of molybdenum diselenide and tungsten diselenide using liquid crystal." Nano letters 17.3 (2017): 1474-1481.
(Continued)

*Primary Examiner* — Jia X Pan
(74) *Attorney, Agent, or Firm* — U.S. Naval Academy; Stephen T. Hunnius (57) ABSTRACT

An electro-optical liquid crystal cell comprising a first substrate, a first layer of indium tin oxide (ITO) on the first substrate, a first layer of $WSe_2$ on the first layer of ITO on the first substrate, and a layer of liquid crystal on the first layer of $WSe_2$ on the first layer of ITO on the first substrate. Furthermore, the electro-optical liquid crystal cell can comprise a second layer of $WSe_2$, a second layer of ITO, and a second substrate. This $WSe_2$ cell exhibits the required electro-optic effect needed for a liquid crystal display. This $WSe_2$ cell exhibits high optical transmission.

8 Claims, 5 Drawing Sheets

(56) References Cited

OTHER PUBLICATIONS

Bertoni, Roman, et al. "Generation and evolution of spin-, valley-, and layer-polarized excited carriers in inversion-symmetric WSe 2." Physical review letters 117.27 (2016): 277201.

* cited by examiner

UTILIZING 2D MONOLAYER WSE2 NANOSHEETS AS THE PLANAR-ALIGNMENT AGENT IN AN ELECTRO-OPTICAL LIQUID CRYSTAL DEVICE TO IMPROVE ITS OPTICAL TRANSMISSION

REFERENCE TO RELATED APPLICATION

This application is a non-provisional of, and claims priority to and the benefits of, U.S. Provisional Patent Application No. 63/062,802 filed on Aug. 7, 2020, the entirety of which is herein incorporated by reference.

BACKGROUND

This disclosure concerns utilizing a two-dimensional (2D) monolayer tungsten diselenide ($WSe_2$) nanosheets as the planar-alignment agent in an electro-optical liquid crystal (LC) device and thereby improving its optical transmission.

This disclosure concerns a method for achieving planar-alignment of liquid crystal (LC) employing two-dimensional (2D) monolayer tungsten diselenide ($WSe_2$) nanosheets in an electro-optic LC device.

This disclosure concerns procedures for attaining electro-optic switching of an LC in this $WSe_2$-based LC device.

A novel product is described herein with a $WSe_2$-based LC device that exhibits more optical transparency than a regular polyimide (PI) alignment layer-based LC device.

Monolayer tungsten diselenide ($WSe_2$) is a highly stable two-dimensional (2D) semiconductor which has a hexagonal lattice structure.

Here, we demonstrate that 2D monolayer $WSe_2$ film imposes planar-alignment to a nematic liquid crystal (LC) in an electro-optic device.

Optically anisotropic LC materials are vastly employed in modern electro-optical display technology. Conventionally, unidirectionally rubbed polyimide (PI) layers are used as the planar-alignment agent in standard optically transmissive liquid crystal displays (LCDs), where the LC molecules align with the alkyl side chains along the rubbing direction on the PI layers, achieving a homogeneous (i.e., uniform planar) director ($\hat{n}$) profile inside the device.

However, the prior art LC alignment process using the rubbed PI layers triggers some disadvantages. For example, a large distribution of pre-tilt angles of the LC developed due to the uneven mechanical rubbing process on the PI layers generates non-uniform brightness in the LCD panel; free ion impurities stemming from the PI alignment layers can contaminate the LC; and the residual fiber dust from the rubbing process of the PI layers increases the contaminants in the LC. Moreover, the organic PI layers are responsive to UV light and high temperature, and therefore, the alignment characteristics are affected when the PI-based LC devices are exposed to UV light and high temperature.

Thus, it is important to find alternate LC alignment methods using inorganic alignment agents, to solve these long-standing problems in the prior art.

$WSe_2$ is an inorganic 2D hexagonal nanostructure.

The LC aligns on the 2D hexagonal nanostructures, including $WSe_2$, due to the epitaxial interaction between the LC's benzene rings and the honeycomb crystal structure of the 2D hexagonal nanostructures.

It has been found using the density functional calculations that the alignment of the LC molecules has a distinct preferential direction along the armchair direction on the $WSe_2$ lattice with an adsorption energy ~1.708 eV/molecule.

Here, we report that the 2D monolayer $WSe_2$ film can function as the planar-alignment agent, without any additional PI layers, in an LC device that exhibits the required electro-optical effect on the application of a voltage.

This new electro-optic device also shows higher optical transparency than a regular PI alignment layer-based LC device. The thickness of monolayer $WSe_2$ is ~0.7 nm. Utilizing the 2D monolayer $WSe_2$ films instead of the regular PI alignment layers effectively reduces the thickness of all the alignment layers from 120 nm to less than 2 nm. For electro-optic devices, the order of magnitude reduction in path length through absorbing layers makes it possible to achieve higher optical throughput.

SUMMARY OF DISCLOSURE

Description

This disclosure concerns utilizing a two-dimensional (2D) monolayer tungsten diselenide ($WSe_2$) nanosheets as the planar-alignment agent in an electro-optical liquid crystal (LC) device and thereby improving its optical transmission.

This disclosure concerns a method for achieving planar-alignment of liquid crystal (LC) employing two-dimensional (2D) monolayer tungsten diselenide ($WSe_2$) nanosheets in an electro-optic LC device.

This disclosure concerns procedures for attaining electro-optic switching of an LC in this $WSe_2$-based LC device.

A novel product is described herein with a $WSe_2$-based LC device that exhibits more optical transparency than a regular polyimide (PI) alignment layer-based LC device.

DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings.

DETAILED DESCRIPTION OF THE INVENTION

This disclosure concerns utilizing a two-dimensional (2D) monolayer tungsten diselenide ($WSe_2$) nanosheets as the planar-alignment agent in an electro-optical liquid crystal (LC) device and thereby improving its optical transmission.

This disclosure concerns a method for achieving planar-alignment of liquid crystal (LC) employing two-dimensional (2D) monolayer tungsten diselenide ($WSe_2$) nanosheets in an electro-optic LC device.

This disclosure concerns procedures for attaining electro-optic switching of an LC in this $WSe_2$-based LC device.

A novel product is described herein with a $WSe_2$-based LC device that exhibits more optical transparency than a regular polyimide (PI) alignment layer-based LC device.

Monolayer tungsten diselenide ($WSe_2$) is a highly stable two-dimensional (2D) semiconductor which has a hexagonal lattice structure.

Here, we demonstrate that 2D monolayer $WSe_2$ film imposes planar-alignment to a nematic liquid crystal (LC) in an electro-optic device.

$WSe_2$ is a transition metal dichalcogenide. A transition metal dichalcogenide concerns very different material science from insulators.

In a $WSe_2$ 2D lattice, each selenium (Se) atom is bonded to three tungsten (W) atoms in a pyramidal geometry. That is why $WSe_2$ attains an asymmetric 2D hexagonal structure. Because of the asymmetric hexagonal structure of $WSe_2$, the liquid crystal prefers the armchair direction, in contrast, an insulator with a symmetric hexagonal structure (such as h-BN) allows the LC to align both along the armchair and zigzag directions.

Conventionally, unidirectionally rubbed polyimide (PI) layers are used as the planar-alignment agent in standard optically transmissive liquid crystal displays (LCDs), where the LC molecules align with the alkyl side chains along the rubbing direction on the PI layers, achieving a homogeneous (i.e., uniform planar) director (n̂) profile inside the device.

However, the prior art LC alignment process using the rubbed PI layers triggers some disadvantages, as discussed above.

Thus, it is important to find alternate an LC alignment method using inorganic alignment agents.

$WSe_2$ is an inorganic 2D hexagonal nanostructure.

The LC aligns on the 2D hexagonal nanostructures, including $WSe_2$, due to the epitaxial interaction between the LC's benzene rings and the honeycomb crystal structure of the 2D hexagonal nanostructures.

It has been found using the density functional calculations that the alignment of the LC molecules has a distinct preferential direction along the armchair direction on the $WSe_2$ lattice with an adsorption energy ~1.708 eV/molecule.

Here, we report that the 2D monolayer $WSe_2$ film can function as the planar-alignment agent, without any additional PI layers, in an LC device that exhibits the required electro-optical effect on the application of a voltage.

This new electro-optic device also shows higher optical transparency than a regular PI alignment layer-based LC device. The thickness of monolayer $WSe_2$ is ~0.7 nm. Utilizing the 2D monolayer $WSe_2$ films instead of the regular PI alignment layers effectively reduces the thickness of all the alignment layers from 120 nm to less than 2 nm. For electro-optic devices, the order of magnitude reduction in path length through absorbing layers makes it possible to achieve higher optical throughput.

Example 1

The Electro-Optic LC Cell Employing Monolayer 2D $WSe_2$ as the Planar-Alignment Agent.

In a $WSe_2$ lattice, each selenium (Se) atom is bonded to three tungsten (W) atoms in a pyramidal geometry. The side-view hexagonal lattice structure of $WSe_2$ is shown in FIG. 1.

Figure 1:
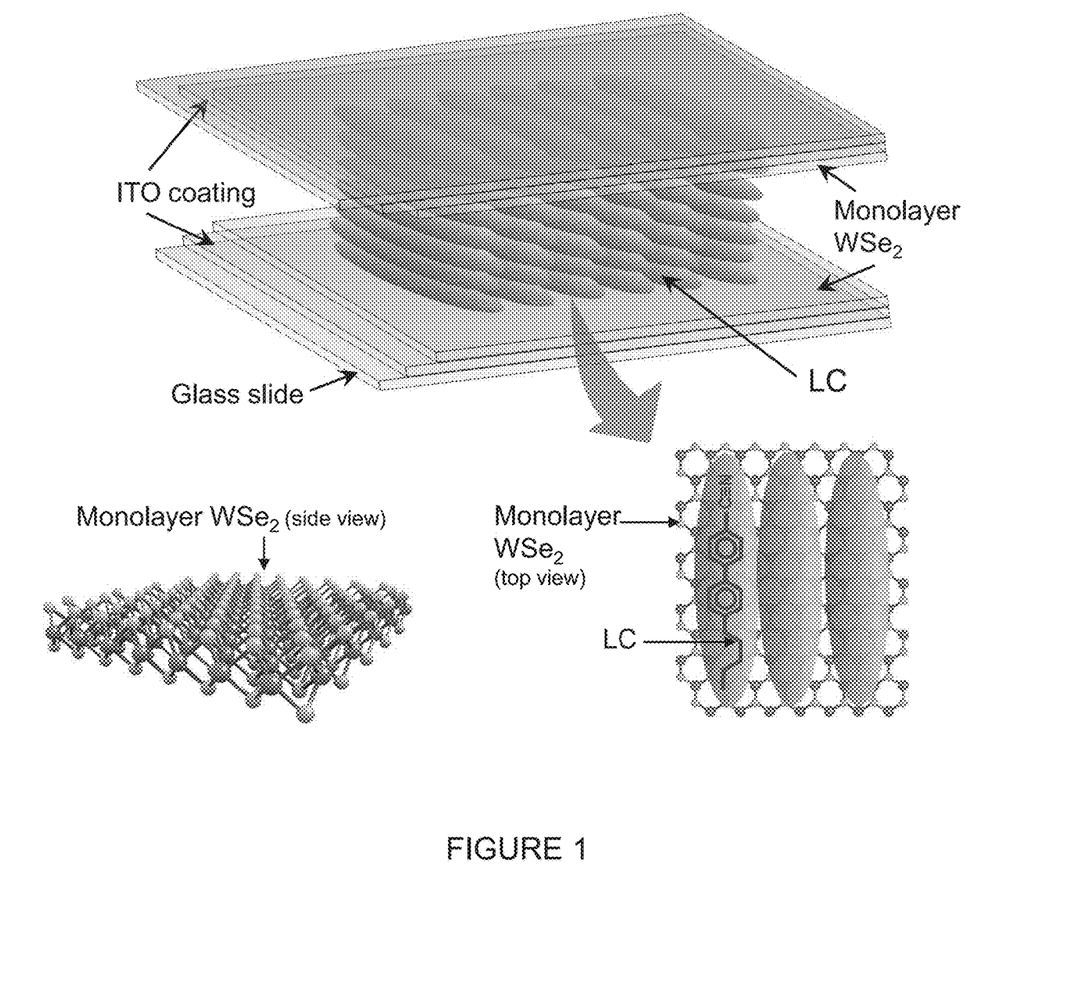
FIG. 1 illustrates a schematic representation of the $WSe_2$/ITO cell containing a layer of ITO and a monolayer 2D $WSe_2$ film on each glass slide. A monolayer 2D $WSe_2$ side-view structure is illustrated on the right side below the cell. The alignment of nematic LC molecules (ellipsoids) on 2D $WSe_2$ (honeycomb structure) is illustrated on the left side below the cell. The epitaxial interaction between the LC and the $WSe_2$ lattice is schematically shown by matching the LC's benzene rings on the $WSe_2$-honeycomb structure.

The LC molecules align better along the armchair direction due to the epitaxial interaction—which is illustrated in FIG. 1.

This spontaneous planar-alignment mechanism of the LC molecules along the armchair direction on this 2D $WSe_2$ lattice is a fundamental principle for employing the monolayer $WSe_2$ as the planar-alignment agent in this electro-optic LC device.

Example 2

Fabricating the Electro-Optic LC Cell Employing Monolayer 2D $WSe_2$ as the Planar-Alignment Agent.

High-quality Chemical Vapor Deposition (CVD) grown monolayer $WSe_2$ film covered across c-cut sapphire was obtained from 2Dsemiconductors Inc. The monolayer 2D $WSe_2$ films from the sapphire substrates were then transferred onto several indium tin oxide (ITO) coated glass substrate employing the standard polymethyl-methacrylate (PMMA) aided wet transfer method. Only 1×1 $cm^2$ area was covered with the transferred monolayer $WSe_2$ on the 2.5×2.5 $cm^2$ ITO coated glass substrates.

Example 3

A $WSe_2$-based cell (with a cell-gap d=16.8 µm) was prepared by placing together two $WSe_2$/ITO glass substrates with the $WSe_2$ sides facing each other. The cell was filled with LC E7 in the isotropic phase by capillary injection from one opening and gentle vacuum suction from the other opening to maintain the average LC-flow in one direction during the filling process. Then the LC was slowly cooled down in the nematic phase. The $WSe_2$-based cell is schematically presented in FIG. 1. The epitaxial alignment of the LC molecules on the monolayer 2D $WSe_2$ is also schematically shown in FIG. 1.

Figure 2A:
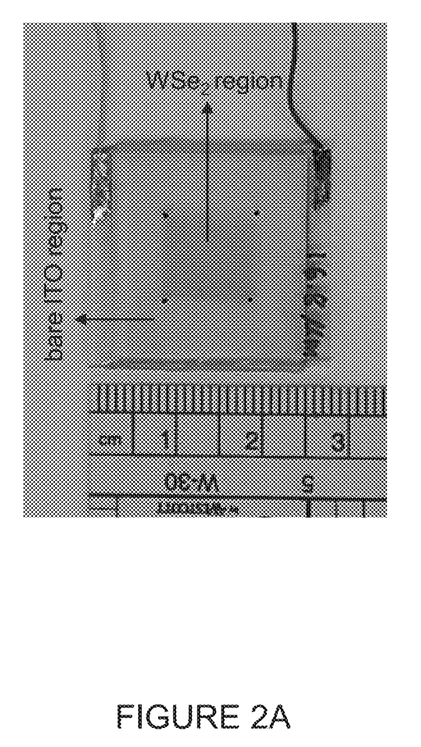
FIG. 2A shows an actual picture (prototype) of a $WSe_2$-based LC cell.
Figure 2B:
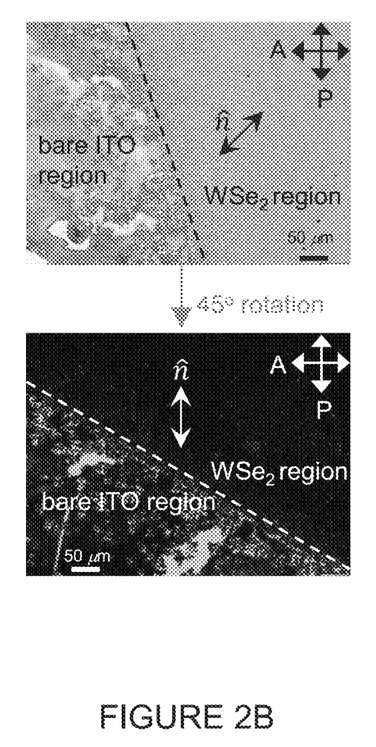
FIG. 2B represents the crossed-polarized micrograph (top) and its 45° rotated state (bottom), respectively, of the $WSe_2$-based LC cell showing uniform planar-alignment of the LC in the $WSe_2$ region and unaligned LC in the bare ITO region.

FIG. 2A shows the picture (prototype) of the $WSe_2$-based LC cell. The top micrograph in FIG. 2B shows that LC gains a uniform planar-aligned state, with the director n̂ at 45° with the crossed polarizers, in-between the two $WSe_2$ monolayers in the $WSe_2$-based cell. The dashed line presents the edge of the monolayer 2D $WSe_2$ film on the ITO substrate in the cell. The right side of the dashed line shows that the LC achieves a uniform planar-aligned state. The left side of the dashed line shows the randomly oriented LC domains in the bare ITO region. As expected, the LC does not achieve uniform planar alignment where there are only two bare ITO layers present in the cell.

Example 4

After the cell is rotated counterclockwise through 45° under the crossed-polarized microscope, the uniform planar-aligned LC, in-between the two WSe$_2$ monolayers, exhibits a dark uniform texture with n̂ at 0° with respect to the polarizer, as shown in the bottom micrograph in FIG. 2B.

This study establishes that the LC achieves uniaxial planar-alignment (i.e., homogeneous alignment) in-between the two WSe$_2$ monolayers in the WSe$_2$-based cell due to the epitaxial interaction.

Example 5

To realize the LC's planar-alignment quality in this WSe$_2$-based cell, the cell was rotated under the crossed-polarized microscope, and the change in the transmitted intensity only through the WSe$_2$ region of the cell was recorded at every 2° rotation-step. The results are presented in FIG. 3.

Figure 3:
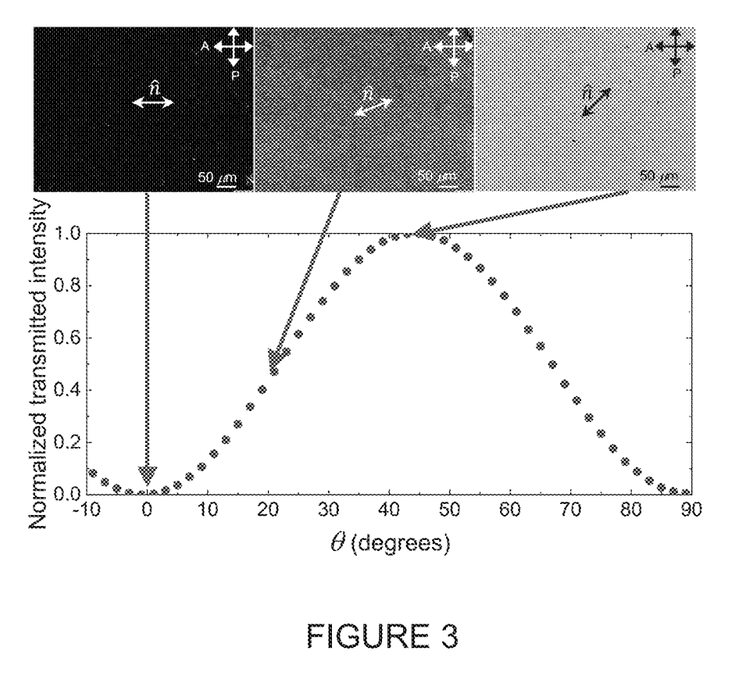
FIG. 3 illustrates the three crossed-polarized micrographs ($\theta$=0°, 22.5°, 45°, respectively) of LC E7 in the $WSe_2$-based device and the normalized transmitted intensity as a function of $\theta$, the angle between the average LC director, $\hat{n}$ in the cell and the analyzer.

The angle between the average LC director, n̂ and the analyzer is defined by θ. In FIG. 3, the top three micrographs present the LC texture in the WSe$_2$-based cell, where θ=0°, 22.5°, and 45°, respectively. The bottom graph in FIG. 3 shows the normalized transmitted intensity of the WSe$_2$-based LC cell under the crossed-polarized microscope as a function of θ.

This transition of the transmitted intensity from a uniform dark texture to a uniform bright texture at every 45° rotation confirms that the two WSe$_2$ monolayers can impose homogeneous alignment on the LC inside the device.

Example 6

Electro-Optical Effect of LC in WSe$_2$/ITO Cell.

Another embodiment of this invention is that the WSe$_2$-based LC cell exhibits the typical electro-optical effect—which is essential for the LCD technology.

The electro-optical effect of LC E7 in the WSe$_2$-based cell was studied using an optical setup where the cell was mounted between two crossed polarizers, and n̂ in the cell was oriented at 45° with respect to the crossed polarizers. A 5-mW He—Ne laser beam of wavelength 633 nm was sent through the polarizer, the WSe$_2$-based LC cell, the crossed analyzer, and into a photodetector, which was fed into a dc voltmeter to measure the transmitted intensity. The applied ac voltage at $f$=1000 Hz across the cell was gradually ramped up, and the change in the transmitted intensity was detected from the dc voltmeter.

Example 7

The same experiment was also carried out under the crossed polarized microscope with a white light source, and several micrographs of the WSe$_2$-based LC cell at different applied voltages were taken. When the applied voltage across the cell exceeds Fréedericksz threshold value, n̂ rotates from the initial planar orientation to homeotropic orientation, and the LC's effective birefringence, <Δn> changes as a function of the applied voltage.

In our optical setup, n̂ is initially oriented at 45° with the crossed polarizers. Therefore, if $I_o$ is the intensity of the plane-polarized light incident on the WSe$_2$-based LC cell, then the transmitted optical intensity, I at the exit of the analyzer shows an oscillatory behavior according to the equation $$I = I_o \sin^2\left(\frac{\pi d \langle \Delta n \rangle}{\lambda}\right) \quad (1)$$

where λ is the wavelength of the laser beam and d is the cell-gap.

Figure 4A:
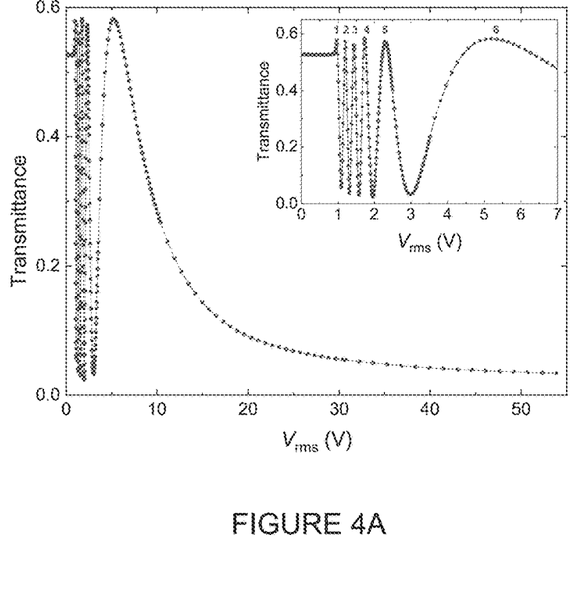
FIG. 4A illustrates the transmittance, $I/I_o$ of LC E7 (T=22° C.) in the $WSe_2$-based LC device as a function of applied ac voltage (*f*=1000 Hz). A smaller voltage range of the same transmittance curve is shown in the inset, where six maxima can be clearly counted.

FIG. 4A exhibits the oscillatory response of the transmittance, $I/I_o$ of LC E7 in the WSe$_2$-based LC cell as a function of the applied ac voltage according to Eq. 1.

The number of maxima appearing in the transmittance curve in FIG. 4A is given by (d Δn/λ). Using Δn=0.225 for LC E7, λ=633 nm for the He—Ne laser and, the WSe$_2$-based LC cell-gap, d=16.8 μm, we obtain (d Δn/λ)≈6. The transmittance curve in a smaller voltage range in the inset in FIG. 4A shows six maxima—which confirms a complete director rotation from the planar state to the homeotropic state in the WSe$_2$-based LC cell.

The inset also shows a sharp Fréedericksz transition ($V_{th}$=0.88 V), indicating that the 2D WSe$_2$ is able to supply the required amount of planar-anchoring strength as the alignment agent in the cell.

Figure 4B:
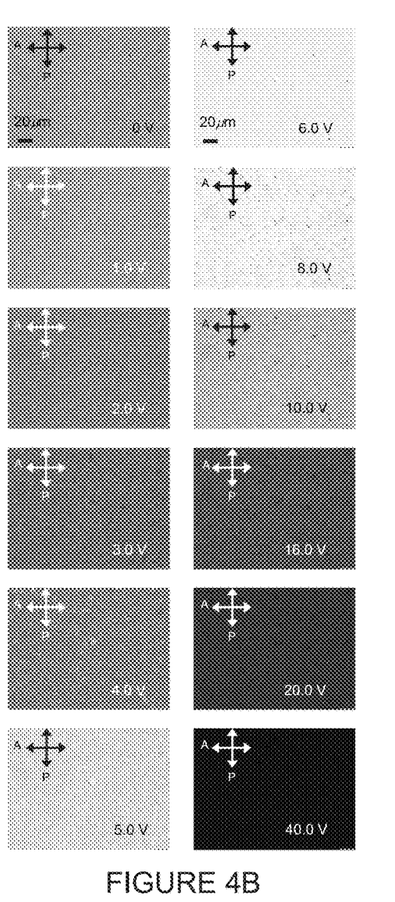
FIG. 4B illustrates twelve separate micrographs of the $WSe_2$-based LC cell under the crossed-polarized optical microscope at different applied voltages.

FIG. 4B shows the micrographs of the LC texture in the WSe$_2$-based LC cell under the crossed-polarized microscope at different applied voltages.

The results indicate that the WSe$_2$-based LC cell exhibits the essential electro-optical effect for a transmissive LC device—where the 2D WSe$_2$ is employed as the planner-alignment agent.

Example 8

Optical Transmission Spectroscopy of the Electro-Optic WSe$_2$/ITO Cell.

We demonstrated that the WSe$_2$/ITO LC device exhibits more optical transparency than a commercial PI/ITO LC cell.

Figure 5:
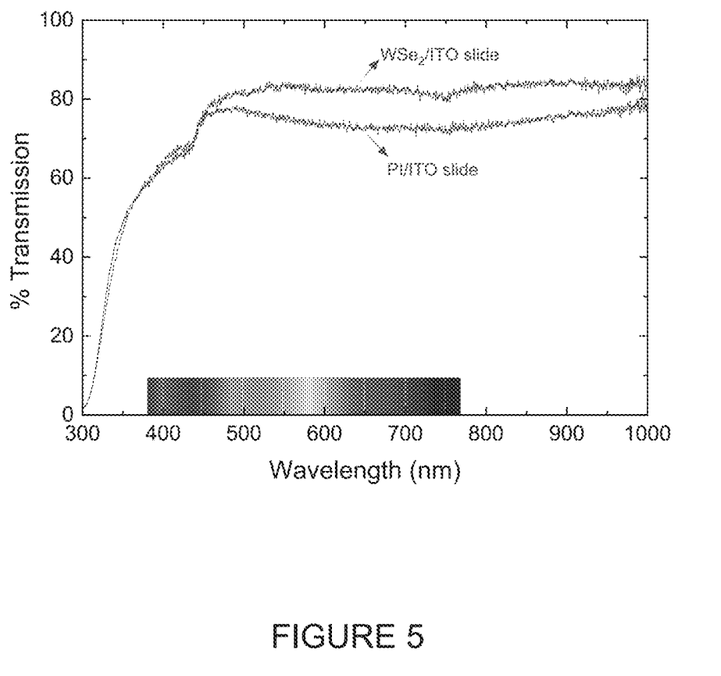
FIG. 5 illustrates the optical transmission spectroscopy for the $WSe_2$/ITO slide and the PI/ITO slide. The band on the x-axis shows the visible wavelength range.

The optical transmission spectra of a standard PI/ITO substrate and the WSe$_2$/ITO substrate were studied using FLAME-S-XR1-ES (Ocean Optics, Inc.) spectrometer in the wavelength range from 300 nm to 1000 nm. A standard planar PI material, KPI-300B (60 nm thick layer on an ITO slide), was used for the PI/ITO slide. The transmission spectra for these two slides are shown in FIG. 5.

The thickness of monolayer WSe$_2$ is ~0.7 nm. Using a monolayer 2D WSe$_2$ film instead of the PI layers reduces the alignment layer thickness from 60 nm to ~0.7 nm.

Therefore, as expected, the WSe$_2$/ITO substrate shows more optical transparency than the standard PI/ITO substrate. Thus, utilizing monolayer 2D WSe$_2$ as the alignment-agent minimizes the transmissive losses over a wide spectral range in the LC device.

Some advantages and features include, but are not limited to, the following.

This invention demonstrates the utility of monolayer 2D WSe$_2$ as the planar-alignment agent.

This invention discloses that the WSe$_2$/ITO LC device demonstrates an excellent electrically-controlled birefringence effect.

The invention enables a new product employing monolayer 2D WSe$_2$ as the planar-alignment agent in an LC display to reduce the transmissive losses (i.e., to increase the optical transparency) over a broad spectral range.

The hexagonal 2D layer is not necessarily limited to WSe$_2$, but includes any other 2D hexagonal material to align LC materials and mixtures. Potential materials include, but are not limited to, graphene, molybdenum disulfide, molybdenum diselenide, tungsten disulfide.

The monolayer 2D $WSe_2$ nanosheets may be chemically modified directly to promote uniaxial LC alignment on the surface.

Uniaxial alignment of LC on $WSe_2$ may be promoted by adding an additional photoalignment step, whereby polarized light is used to absorb or chemically bond LC-compatible molecules to the $WSe_2$ surface.

Uniaxial alignment of LC on $WSe_2$ may be promoted by non-surface means including, but not limited to, flow alignment, photo-orientation and slow cooling from the isotropic phase.

The LC layer can be comprised of a single molecular component or mixtures of components with a liquid crystal phase, including but not limited to nematic, cholesteric, smectic, and discotic phases.

The LC may possess a positive or negative dielectric anisotropy and a permanent molecular dipole to facilitate molecular switching in response to an applied voltage.

The $WSe_2$ can be multi-layered.

The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

I claim:

1. An electro-optical liquid crystal cell, comprising:
   a first substrate;
   a first layer of indium tin oxide (ITO) on the first substrate;
   a first layer of two-dimensional tungsten diselenide ($WSe_2$) on the first layer of ITO on the first substrate; and
   a layer of liquid crystal on the first layer of $WSe_2$ on the first layer of ITO on the first substrate;
   a second layer of two-dimensional $WSe_2$ on the layer of liquid crystal;
   a second layer of ITO on the second layer of $WSe_2$ on the layer of liquid crystal; and
   a second substrate on the second layer of ITO on the second layer of $WSe_2$ on the layer of liquid crystal.

2. The electro-optical liquid crystal cell of claim 1
   wherein the first layer of $WSe_2$ has a thickness of about 0.7 nm and
   wherein the second layer of $WSe_2$ has a thickness of about 0.7 nm.

3. The electro-optical liquid crystal cell of claim 2
   wherein a cell-gap is about 16.8 μm;
   wherein the layer of liquid crystal comprises liquid crystal molecules; and
   wherein the liquid crystal molecules achieve a uniform planar aligned state due to the epitaxial interaction between the liquid crystal molecules and $WSe_2$.

4. The electro-optical liquid crystal cell of claim 2 claim 1
   wherein the first layer of $WSe_2$ and the second layer of $WSe_2$ are aligned in the same direction to promote uniaxial liquid crystal alignment in the cell.

5. The electro-optical liquid crystal cell of claim 4
   wherein the first layer of $WSe_2$ is a monolayer; and
   wherein the second layer of $WSe_2$ is a monolayer.

6. The electro-optical liquid crystal cell of claim 5
   wherein the $WSe_2$ comprises an asymmetric hexagonal structure since each selenium (Se) atom is bonded to three tungsten (W) atoms in a pyramidal geometry in the $WSe_2$ lattice; and
   wherein the liquid crystal director of the liquid crystal molecules is oriented in the armchair direction of the $WSe_2$ lattice.

7. A method of making an electro-optical liquid crystal cell, comprising:
   providing a first substrate;
   providing a first layer of indium tin oxide (ITO) on the first substrate;
   providing a first layer of tungsten diselenide ($WSe_2$) on the first layer of ITO on the first substrate; and
   providing a layer of liquid crystal on the first layer of $WSe_2$ on the first layer of ITO on the first substrate;
   providing a second layer of $WSe_2$ on the layer of liquid crystal;
   providing a second layer of ITO on the second layer of $WSe_2$ on the layer of liquid crystal; and
   providing a second substrate on the second layer of ITO on the second layer of $WSe_2$ on the layer of liquid crystal.

8. The method of making an electro-optical liquid crystal cell of claim 7
   wherein the first layer of $WSe_2$ has a thickness of about 0.7 nm and
   wherein the second layer of $WSe_2$ has a thickness of about 0.7 nm.

* * * * *